US009515995B2

(12) United States Patent
Wang et al.

(10) Patent No.: US 9,515,995 B2
(45) Date of Patent: Dec. 6, 2016

(54) METHOD AND APPARATUS FOR NETWORK ADDRESS TRANSLATION AND FIREWALL TRAVERSAL

(71) Applicant: Futurewei Technologies Inc., Plano, TX (US)

(72) Inventors: Xiaobo Wang, San Jose, CA (US); Yilin Gan, San Ramon, CA (US); Jing Li, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 14/142,465

(22) Filed: Dec. 27, 2013

(65) Prior Publication Data

US 2015/0188882 A1 Jul. 2, 2015

(51) Int. Cl.
*H04L 29/06* (2006.01)
*H04L 29/12* (2006.01)

(52) U.S. Cl.
CPC ......... *H04L 63/029* (2013.01); *H04L 61/2575* (2013.01); *H04L 61/2589* (2013.01); *H04L 65/1046* (2013.01); *H04L 65/1066* (2013.01); *H04L 65/1069* (2013.01); *H04L 65/1073* (2013.01); *H04L 61/1529* (2013.01); *H04L 61/2514* (2013.01); *H04L 61/2564* (2013.01); *H04L 61/6004* (2013.01)

(58) Field of Classification Search
CPC .................................................. H04L 61/2589
USPC ........................................................ 370/352
See application file for complete search history.

(56) References Cited

U.S. PATENT DOCUMENTS

| | | | |
|---|---|---|---|
| 2008/0288580 A1* | 11/2008 | Wang et al. | 709/203 |
| 2012/0036192 A1* | 2/2012 | Abuan et al. | 709/204 |
| 2013/0308628 A1* | 11/2013 | Marueli et al. | 370/352 |
| 2015/0120879 A1* | 4/2015 | Yoakum | G06F 17/30861 709/219 |

OTHER PUBLICATIONS

D'Acunto, L., Pouwelse, J.A., and Sips, H.J., "A Measurement of NAT & Firewall Characteristics in Peer to Peer Systems", in Proc. 15-th ASCI Conference, Jun. 2009.*
Rosenburg, Jonathan, "Request for Comments: 5245; Interactive Connectivity Establishment (ICE): A Protocol for Network Address Translator (NAT) Traversal for Offer/Answer Protocols", Internet Engineering Task Force, Apr. 2010.*

(Continued)

*Primary Examiner* — Luat Phung
*Assistant Examiner* — Thomas R Cairns
(74) *Attorney, Agent, or Firm* — Futurewei Technologies, Inc.

(57) ABSTRACT

Various disclosed embodiments include methods and systems for network address translation traversal. The method comprises receiving, at a Voice over Internet Protocol (VoIP) server, a registration message from a first user equipment (UE). The registration message includes an Interactive Connectivity Establishment (ICE) capability of the first UE, and a request that the VoIP server generate ICE parameters for the first UE when the first UE makes a call to a second UE. The ICE parameters include a Traversal Using Relays around NAT (TURN) long-term credential. The method comprises sending, from the VoIP server, the TURN long-term credential to the first UE.

24 Claims, 6 Drawing Sheets

(56) References Cited

OTHER PUBLICATIONS

Rosenburg, Jonathan, "Request for Comments: 5768; Indicating Support for Interactive Connectivity Establishment (ICE) in the Session Initiation Protocol (SIP)", Internet Engineering Task Force, Apr. 2010.*

Camarillo, Gonzalo et al, "Request for Comments: 6156; Traversal Using Relays around NAT (TURN) Extension for IPv6", Internet Engineering Task Force, Apr. 2011.*

Mahy, Rohan et al, "Request for Comments: 5766; Traversal Using Relays around NAT (TURN): Relay Extensions to Session Traversal Utilities for NAT (STUN)", Internet Engineering Task Force, Apr. 2010.*

* cited by examiner

METHOD AND APPARATUS FOR NETWORK ADDRESS TRANSLATION AND FIREWALL TRAVERSAL

TECHNICAL FIELD

The present disclosure relates generally to network address translation.

BACKGROUND

A Network Address Translation (NAT) device modifies an IP address and port in an IP header when a packet transits across the NAT device. NAT devices are widely deployed at home/enterprise networks and the internet. NAT devices, however, break Voice over Internet Protocol (VoIP) calls.

Some firewalls are configured to block User Datagram Protocol (UDP) and only allow Hypertext Transfer Protocol (HTTP) (TCP 80) or HTTP Secure (HTTPS) (TCP 443) to pass, usually for security reasons. Because voice packets are sent on UDP, firewalls that block UDP also block voice traffic. To summarize, both NAT and firewalls that block UDP can block media communication in VoIP and result in one-way voice or no voice.

It would therefore be desirable to provide an improved NAT/Firewall traversal.

SUMMARY

According to one embodiment, there is provided a method for network address translation traversal. The method comprises receiving, at a Voice over Internet Protocol (VoIP) server, a registration message from a first user equipment (UE). The registration message includes an Interactive Connectivity Establishment (ICE) capability of the first UE, and a request that the VoIP server generate ICE parameters for the first UE when the first UE makes a call. The ICE parameters include a Traversal Using Relays around NAT (TURN) long-term credential. The method comprises sending, from the VoIP server, the TURN long-term credential to the first UE.

In another embodiment, there is provided an electronic device. The electronic device comprises a processor and memory coupled to the processor. The electronic device is configured to send, to a Voice over Internet Protocol (VoIP) server, a registration message. The registration message includes an Interactive Connectivity Establishment (ICE) capability of the electronic device, and a request that the VoIP server generate ICE parameters for the electronic device when the electronic device makes a call. The ICE parameters include a Traversal Using Relays around NAT (TURN) long-term credential. The electronic device is configured to receive, from the VoIP server, the TURN long-term credential.

In another embodiment, there is provided A Voice over Internet Protocol (VoIP) server. The VoIP server comprises a processor and memory coupled to the processor. The VoIP server is configured to receive a registration message from a first user equipment (UE). The registration message includes an Interactive Connectivity Establishment (ICE) capability of the first UE, and a request that the VoIP server generate ICE parameters for the first UE when the first UE makes a call to a second UE. The ICE parameters include a Traversal Using Relays around NAT (TURN) long-term credential. The VoIP server is configured to send the TURN long-term credential to the first UE.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
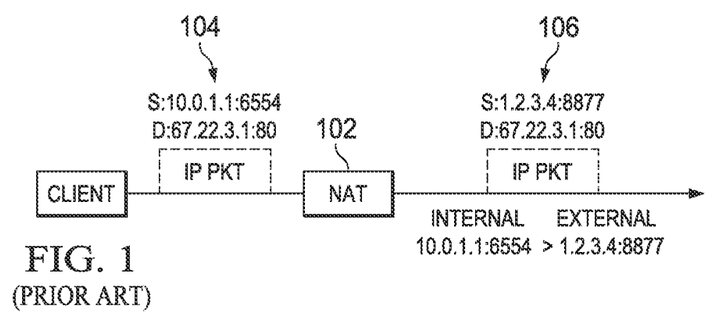
FIG. 1 illustrates a NAT device that translates a source IP/port of a packet to a new value.

An example NAT device 102 is shown in FIG. 1 where the NAT device 102 translates the source IP/port of a packet 104 to a new value 106 (e.g., 10.0.1.1:6554→1.2.3.4:8877) as the packet transits across it. NAT devices can solve an Internet Protocol version 4 (IPv4) address shortage problem by reusing private IP addresses. NAT devices also hide internal network topologies from outside for security protection. NAT devices are widely deployed at home/enterprise networks and the internet. A study by L. D'Acunto, J. A. Pouwelse, and H. J. Sips, "A Measurement of NAT & Firewall Characteristics in Peer to Peer Systems", in Proc. 15-th ASCI Conference, June 2009 (hereinafter "D'Acunto") shows that about 90% of internet access connections for peer-to-peer (P2P) communication traverse through some type of NAT/Firewall devices.

NAT devices, however, break Voice over Internet Protocol (VoIP) calls. A VoIP call is established in two stages. In stage one, an originating user equipment (UE) (e.g., cellular telephone; computer; etc.) sends signaling messages to a signaling server to register itself, e.g., through a REGISTER message in Session Initiation Protocol (SIP). The UE then sends signaling messages to initiate a call, e.g., an INVITE in SIP. The signaling server routes the INVITE message to a peer device (e.g., the called UE). The peer sends responses (e.g., 200 OK in SIP) through the signaling server to the calling UE. The calling UE sends an acknowledgement (ACK) back and the call is established.

In stage two, the UEs exchange media packets directly or through a media server for voice conversation. The signaling server and the media server can be the same server or separate servers. The NAT breaks VoIP calls because the originating UE sends its media address in the signaling message when the call is being set up. This is the private IP address of the UE. When a signaling message traverses through a NAT device, the NAT device changes the UE's private address to a public address at the IP layer. However, the NAT device does not update the media address at the signaling layer. When a UE or media server tries to send media packets to the peer, it extracts the media address from the signaling message and tries to send media packets to the media address. Because this address is not "NATted" and is a private address that is not reachable from outside, the media packets will be discarded by routers or switches on the path.

Some firewalls are configured to block User Datagram Protocol (UDP) and only allow Hypertext Transfer Protocol (HTTP) (TCP 80) or HTTP Secure (HTTPS) (TCP 443) to pass, usually for security reasons. The study in D'Acunto shows that about 10% of P2P communication encounters firewalls that block UDP. Because voice packets are sent on UDP, firewalls that block UDP also block voice traffic. To summarize, both NAT and firewalls that block UDP can block media communication in VoIP and result in one-way voice or no voice.

A common way to solve the NAT/firewall issue is by using ICE/STUN/TURN. ICE/STUN/TURN (Interactive Connectivity Establishment; Session Traversal Utilities for NAT; Traversal Using Relays around NAT) is a suite of protocols defined by the Internet Engineering Task Force (IETF) and also adopted by other standard bodies like the 3rd Generation Partnership Project (3GPP). STUN enables a UE to find its public (NATted) address and use the public address as a media address in the signaling. This is done by the UE sending a STUN message to a STUN server on the public network, which extracts the source address of the received message and sends it back to the UE. Since the STUN message transits across NAT devices, its source address is the NATted public address of the UE.

TURN allows a UE to allocate a relay address on a TURN server and use the relay address as its media address in the signaling. Since the TURN server is on a public network, it can be reached by the peer. The TURN server then relays media packets between the two peers.

ICE defines the format for UEs to exchange multiple media address candidates (private, public, and relay) in signaling. ICE also defines the procedure to check which path (a local/remote candidate pair) works. FIG. 2 illustrates simplified steps for ICE/STUN/TURN.

Figure 2A:
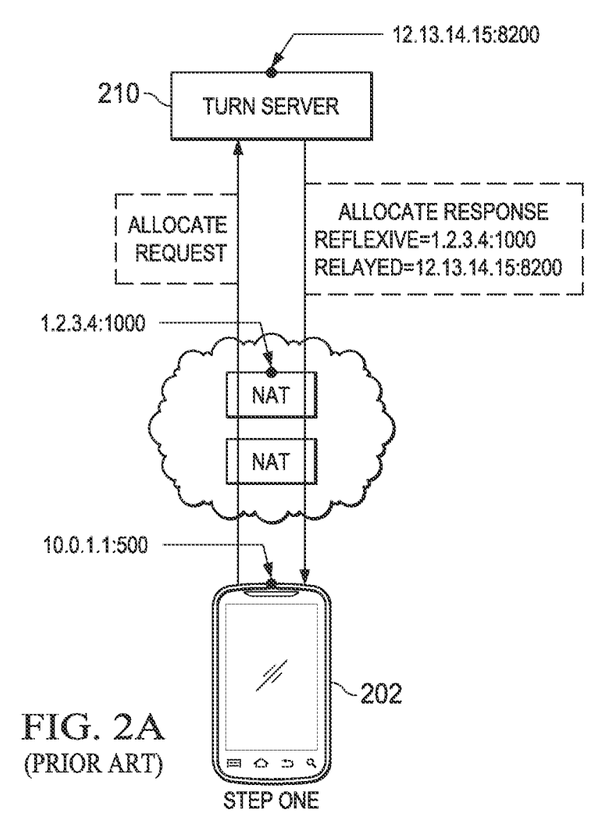
FIG. 2A-2C illustrates a diagram of ICE/STUN/TURN NAT/Firewall traversal solutions for P2P communication.
Figure 2B:
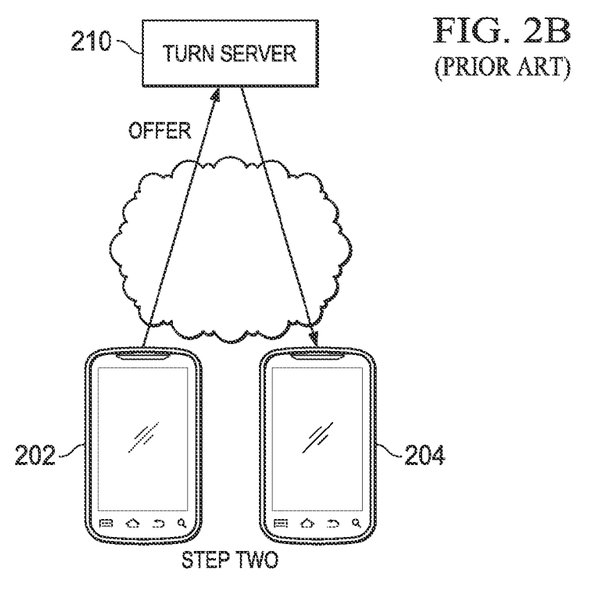
Figure 2C:
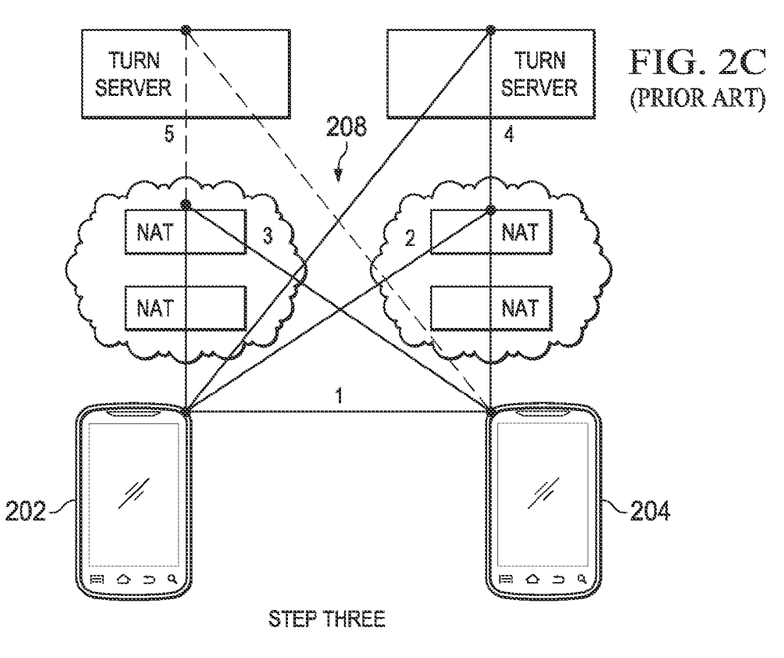

As illustrated in FIG. 2A, during a first step, a first UE 202 collects its public and relay addresses by sending a request to a STUN or TURN server (shown as a TURN server 210 in FIG. 2A). As illustrated in FIG. 2B, during a second step, the first UE sends collected media candidates to the peer or the second UE 204. The peer or second UE 204 collects its public and relay addresses by sending a request to the TURN server 210 and sends collected media candidates to the first UE 202. As illustrated in FIG. 2C, during a third step, the first and second UEs 202, 204 check media paths 208 by sending connectivity check messages for each possible path and select a path that works.

The difference between STUN and TURN is that STUN allows two peers (e.g., UE to UE or UE to media server) to communicate directly so it is more efficient. However, STUN only works for certain types of NAT devices and does not work when both UEs are behind symmetric NAT devices. STUN also cannot solve the firewall traversal issue unless the UE supports media over TCP which is not widely available now. TURN uses a relay server to send media between two peers so it adds delay for media and also cost for deployment. However, TURN works for most types of NAT devices, including symmetric NAT devices. TURN also can solve the firewall traversal issue, e.g., by encapsulating media (RTP) packets in TURN over TCP/80 or TCP 443. This makes the media packets look like HTTP or HTTPS for a firewall, which is likely to let them to pass. The study in D'Acunto indicates that over 10-20% of P2P communication needs some type of symmetric or firewall traversal capability. TURN can be used to solve such problems and the ICE/TURN based solution has been proposed in IETF and 3GPP and has been approved in 3GPP for VoIP/IMS firewall traversal.

Figure 3:
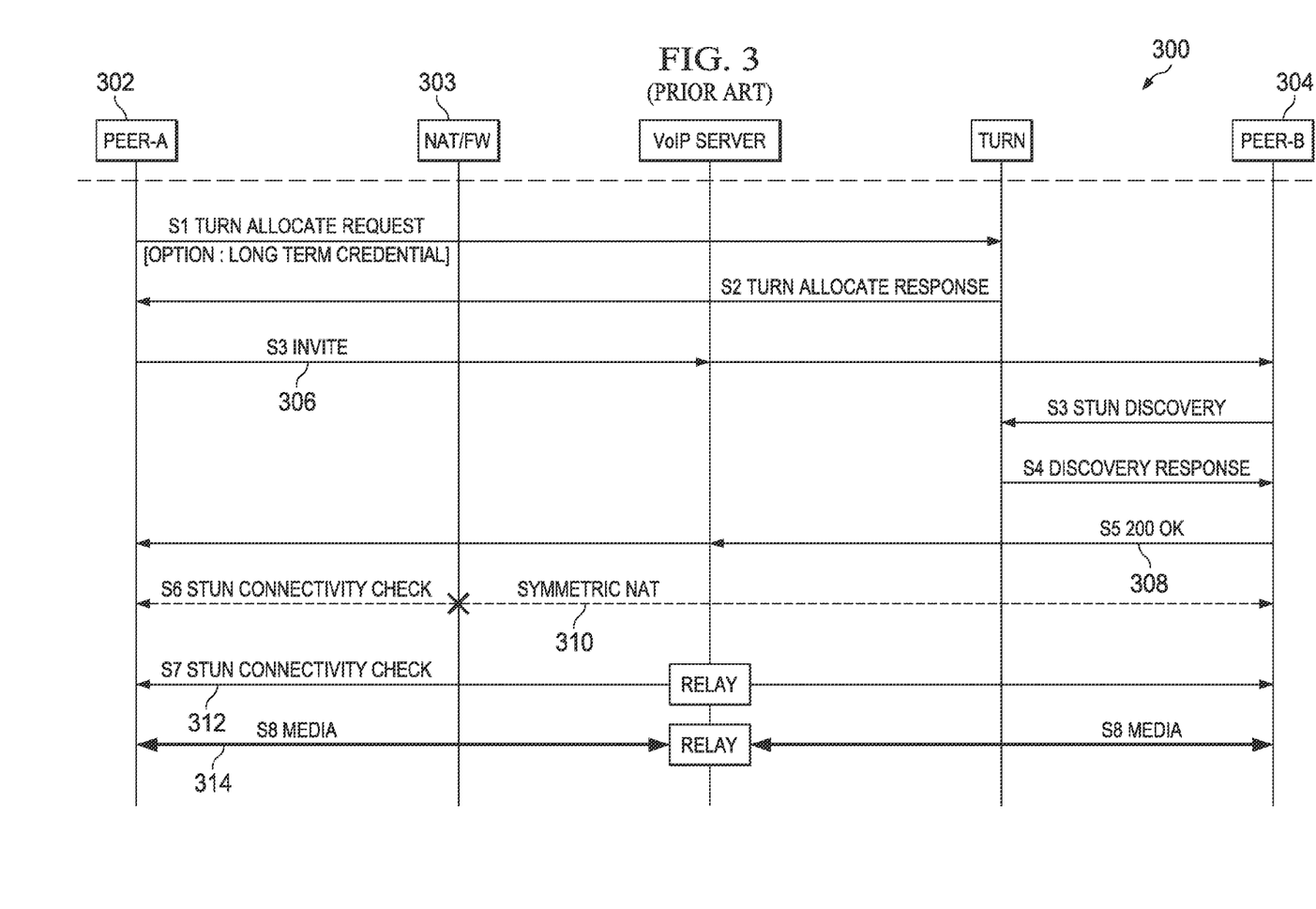
FIG. 3 illustrates an example VoIP call flow diagram using ICE/STUN/TURN.

FIG. 3 illustrates an example VoIP call flow 300 using ICE/STUN/TURN. In the illustrated example, two UEs 302, 304 collect candidate addresses (public and relay address), exchange media candidates through signaling messages (steps 306, 308), perform a connectivity check (steps 310, 312), and exchange media over a selected media path (step 314). Because UEs 302, 304 are behind a symmetric NAT 303, their connectivity check for public addresses fails (step 310). The UEs 302, 304 switch to use a TURN relay server 316 for media communication (step 312). The UE registration process is not shown in FIG. 3 for simplification.

ICE/STUN/TURN are among the most common NAT/Firewall traversal solutions for P2P communication. However, there are several drawbacks with existing ICE/STUN/TURN solutions. One drawback is password provision. For example, ICE/STUN/TURN define a mechanism for message authentication using short-term and long-term credentials. The short-term credential (e.g., user name and password) is exchanged during call setup using signaling. The short-term credential can be used to authenticate STUN/TURN messages after initial signaling exchange, e.g., messages for connectivity check. However, the short-term credential cannot be used for STUN/TURN messages before a UE initiates a call, e.g., requests to allocate relay addresses from a TURN server. Those messages must be authenticated with the long-term credential. Currently there is no well-established mechanism to provide long-term credentials automatically on UEs. This means that UEs need to use unauthenticated requests or use a shared "secret" password among many users, and attackers can exploit this security weakness to launch various attacks, e.g., requesting many relay addresses to exhaust resources on the TURN server, resulting in denial of service to legitimate uses.

Another drawback is TURN server discovery. The TURN server is configured on the UE statically (e.g., manually) or discovered using Domain Name System (DNS) by the UE. There is no way to select a TURN server dynamically based on certain intelligence, e.g., a server with least workload, shortest media path, support of firewall traversal, etc. If the provided TURN server is not the optimal server for a call, e.g., using a long media path or no support of firewall traversal when this function is needed, the media packets will go through a long path or be blocked by firewalls, resulting in service quality issues or calls without media.

Another drawback is call setup optimization. The UE must request relay addresses from the TURN server before making a call. The message exchange between the UE and the TURN server adds delay for call setup time. In addition, because requests are made before call setup, relay addresses are allocated even for failed calls which are unnecessary. The procedure needs to be optimized to reduce call delay and save resources on servers by avoiding sending allocating requests for failed calls.

According to the present disclosure, an enhancement for the ICE/TURN solution is provided that enables automatic TURN username/password provision through a VoIP signaling channel. In addition, the provided enhancement for the ICE/TURN solution enables TURN server selection by a VoIP signaling server or an intermediary node dynamically on a per call basis using some intelligence, e.g., media path length, firewall traversal capability, load condition, etc. This can improve voice quality and avoid calls without media (e.g., blocked by firewall). In addition, the provided enhancement for the ICE/TURN solution provides that the UE does not need to request a relay address before a call. This reduces the number of messages in a call flow and reduces call setup time. In addition, the relay address is allocated by a signaling server, which knows whether a call can proceed (e.g., whether the called party is registered and online). The signaling server can allocate relay addresses only for calls that can proceed, and avoid allocating relay addresses for failed calls, and thus avoid unnecessary communication/operations.

Figure 4:
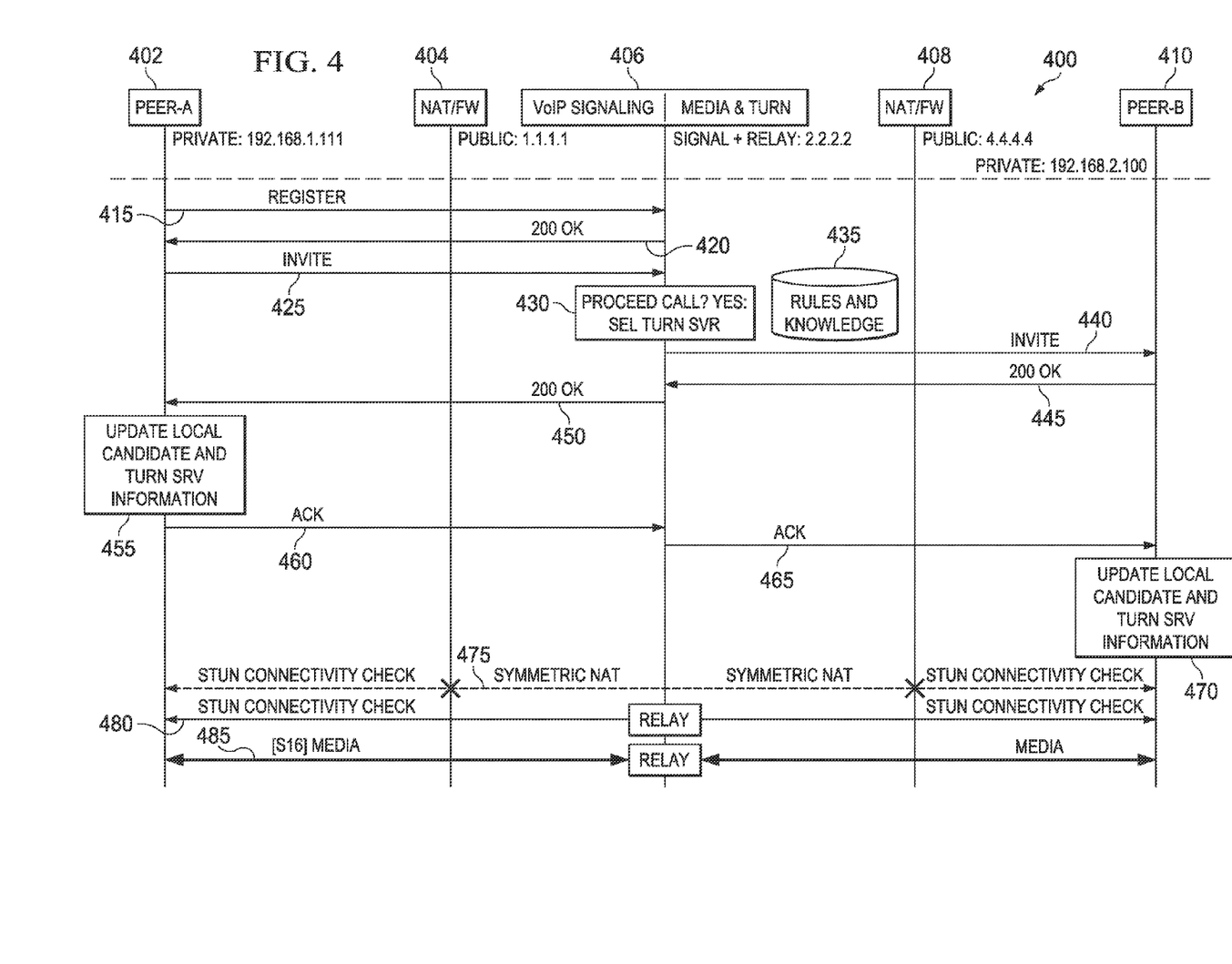
FIG. 4 illustrates a call flow diagram of a system for NAT/Firewall traversal according to one embodiment.

A first embodiment of a system 400 for NAT/firewall traversal in accordance with this disclosure is described in accordance with the call flow diagram of FIG. 4 illustrating a media path optimization. The system 400 includes a first UE 402 (e.g., Peer-A), a first NAT/Firewall 404, a VoIP signaling server 406, a second NAT/Firewall 408, and a second UE 410 (e.g., Peer-B). The first and second UEs 402, 410 are configured to operate and/or communicate in the system 400. For example, the UEs 402, 410 are configured to transmit and/or receive wireless signals or wired signals. Each UE 402, 410 represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the embodiment illustrated in FIG. 4, the VoIP signaling server 406 integrates signaling, media, and TURN functions together. The VoIP signaling server 406 selects this integrated TURN server because it can make a local call to allocate relay addresses from the TURN server. In addition, the TURN server and the media server are integrated on the same host so the TURN server can relay media packets to the media server through a local network or internal calls, resulting in a shortest media path and optimal TURN processing. In this example, the server only adds a srflx candidate for the called party to simplify the description. Note there are no STUN/TURN messages before the call and the media path is the shortest path. Thus the present disclosure optimizes the call setup and media relay process.

The VoIP signaling server 406 may include an operating system that provides executable program instructions for the general administration and operation of that server, and typically will include a computer-readable medium storing instructions that, when executed by a processor of the VoIP signaling server 406, allow the VoIP signaling server 406 to perform its intended functions. Suitable implementations for the operating system and general functionality of the servers are known or commercially available, and are readily implemented by persons having ordinary skill in the art.

According to the present disclosure, when the first UE 402 registers with the VoIP signaling server 406 via a REGISTER message, it indicates its ICE capabilities to the VoIP signaling server 406 and requests the VoIP signaling server 406 to provide ICE parameters, including a TURN long-term credential, TURN server selection and public address candidate (referred to as a srflx candidate) and relay address candidate generation for the first UE when making a call (step 415).

For VoIP using SIP as a signaling protocol, the request is encoded as an "ice-opt" in the REGISTER message, as shown below:
"ice-opt: cred-prov;srflx-gen;relay-gen;"
where the "cred-prov" indicates to provide a TURN long-term credential, the "srflx-gen" indicates to generate srflx candidates for the first UE 402, and the "relay-gen" indicates to select a TURN server and request relay address for the first UE 402.

The VoIP signaling server 406 returns requested parameters (e.g., TURN long-term credential) in its response message "200 OK" (step 420). For VoIP using SIP, the response is encoded as an "ice-opt" header in the "200 OK" response message from the VoIP signaling server 406 to the first UE 402:
"ice-opt: tur-usr=usr1; tur-pwd=pwd1"
where usr1 and pwd1 are the long-term credential for TURN.

The VoIP signaling server 406 also indicates its ICE capabilities to the first UE 402 in the response message "200 OK" (step 420). For VoIP using SIP, the response is encoded as an "ice-opt" header in the "200 OK" response message from the VoIP signaling server 406 to the first UE 402:
"ice-opt: srflx-gen=y; relay-gen=y"
where "srflx-gen=y" indicates that the VoIP signaling server 406 supports discovery of the first UE's 402 public address and will generate the first UE's 402 srflx candidate when the first UE 402 makes a call. The "relay-gen=y" indicates that the server supports TURN server selection and relay candidate allocation for the first UE 402 when the first UE 402 makes a call.

If the first UE 402 needs to request a relay address from the TURN server (e.g., the VoIP signaling server 406 does not support relay address allocation for the first UE 402), the first UE 402 uses the long-term credential provided during registration for relay address request authentication. If the VoIP signaling server 406 supports allocation of the relay address, this step can be skipped.

When the first UE 402 initiates a call, it checks the VoIP signaling server's 406 ICE capabilities. If the VoIP signaling server 406 supports generation of ICE candidates (e.g., srflx, relay), the first UE 402 skips the steps to collect the candidates locally and relies on the VoIP signaling server 406 to generate them. The first UE 402 sends an INVITE request (step 425) with only the host candidate (private address) and without srflx and relay candidates to the VoIP signaling server 406 to initiate a call. It should be noted that there is no STUN/TURN message sent before the call.

The VoIP signaling server 406 receives the INVITE request from the first UE 402 (step 425). The VoIP signaling server 406 checks whether the call can proceed (step 430). If the call cannot proceed, e.g., the called party is not registered or not online, the VoIP signaling server 406 returns an error code to the first UE 402 (not shown) and terminates the call. In such case, no ICE candidates are collected by the VoIP signaling server 406 for the first UE 402.

If the call can proceed, the VoIP signaling server 406 determines whether it needs to generate srflx and relay candidates for the first UE 402 using the mechanism described above. If the answer is "yes", the VoIP signaling server 406 uses the source IP address of the received request from the first UE 402 as the first UE's public address to generate the srflx candidate. The VoIP signaling server 406 uses some local or remote intelligence or rules to select a TURN server and requests the TURN server to allocate a relay address for the first UE 402 (step 435). The rules may be associated with one or more network parameters such as media path, server load, support of firewall traversal, etc. The VoIP signaling server 406 inserts the collected srflx/relay candidates into an INVITE message according to ICE protocols and forwards the INVITE message to the second UE 410 (step 440).

The called party (e.g., the second UE 410) receives the INVITE message and processes the ICE candidates as remote candidates. The second UE 410 sends a "200 OK" message back to the VoIP signaling server 406 (step 445). If the second UE 410 also requests the VoIP signaling server 406 to select the TURN server and generate srflx/relay candidates, it will only include its host candidate in the "200 OK" message.

When the VoIP signaling server 406 receives the "200 OK" message from the second UE 410, it adds the candidates that it collected in the "200 OK" message from the second UE 410 to inform the first UE 402 which candidates have been collected by the VoIP signaling server 406. The server generated candidates are encoded as provision or "p-candidates" attributes. The p-candidate value is identical to the candidate generated by the VoIP signaling server 406. For relay candidates, the VoIP signaling server 406 also appends the selected TURN server address/protocol/port so that the first UE 402 knows which TURN server is selected and how to communicate with the selected TURN server. An example of p-candidate is shown below:
    a=p-candidates: 1 2 UDP 2130705918 1.1.1.1 5555 typ srflx
    a=p-candidates: 1 2 UDP 2130705918 2.2.2.2 6666 typ relay tun-srv 2.2.2.2 udp 3576
In a particular embodiment, the "tur-srv ip-address prot port" is appended to the relay candidate. In a particular embodiment, the p-candidate has the format:
    a=p-candidates: foundation component protocol priority relay-addr typ relay turn-srv tun-srv-addr tur-proto tur-srv-port
where:
    p-candidate is a parameter indicating that the candidate is generated by VoIP server;
    foundation indicates the foundation of the candidate;
    component indicates the component of the candidate;
    protocol indicates the protocol of the media;
    priority indicates the priority of the candidate;
    relay-addr indicates an allocated relay address on the TURN server;
    turn-srv indicates that the following is the server selected turn server address; and
    tun-srv-addr tur-proto tur-srv-port indicates a server selected turn address, protocol and port.

The VoIP signaling server 406 also checks whether it needs to select the TURN server and generate ICE candidates for the called party (e.g., the second UE 410). If so, the VoIP signaling server 406 repeats the steps above to discover the second UE public address, select the TURN server, allocate the relay address, and add the srflx and relay candidates for the called party (e.g., the second UE 410) in the "200 OK" message. The VoIP signaling server 406 forwards the "200 OK" message to the first UE 402 (step 450).

When the first UE 402 receives the "200 OK" message from the VoIP signaling server 406, it checks whether the "200 OK" message includes p-candidates. If so, the first UE 402 adds the p-candidates to its local candidates list as if the candidates were locally generated candidates by the first UE 402. The first UE 402 also records the TURN server selected by the VoIP signaling server 406 (step 455). Thereafter, the first UE 402 sends an "ACK" message to the VoIP signaling server 406 to indicate that call setup is successful (step 460).

When the VoIP signaling server 406 receives the "ACK" message from the first UE 402, it indicates the ICE candidates it generated for the called party and encodes them as "p-candidates" in the "ACK" response as described above.

The VoIP signaling server 406 forwards the "ACK" message to the second UE 410 (step 465).

When the second UE 410 receives the "ACK" message, it retrieves the p-candidates from the "ACK" message and adds the p-candidates to its local candidate list. It also records the TURN server selected by the VoIP signaling server 406 as described above with respect to step 455 (step 470).

When the call is setup, the first and second UEs 402, 410 can exchange ICE messages for the connectivity check, e.g., using STUN binding requests. A particular UE pairs up its local ICE candidates with remote candidates received from signaling messages and sends the connectivity check using the normal ICE procedure. Because each of the UEs 402, 404 is behind a respective symmetric NAT/Firewall 404, 408, their connectivity check for public addresses fails (step 475). If relay candidates are received, the UE sends connectivity through the TURN server selected by the VoIP signaling server 406 (step 480). Thereafter, the first and second UEs 402, 410 find a media path and start sending media packets for voice conversation (step 485).

Figure 5:
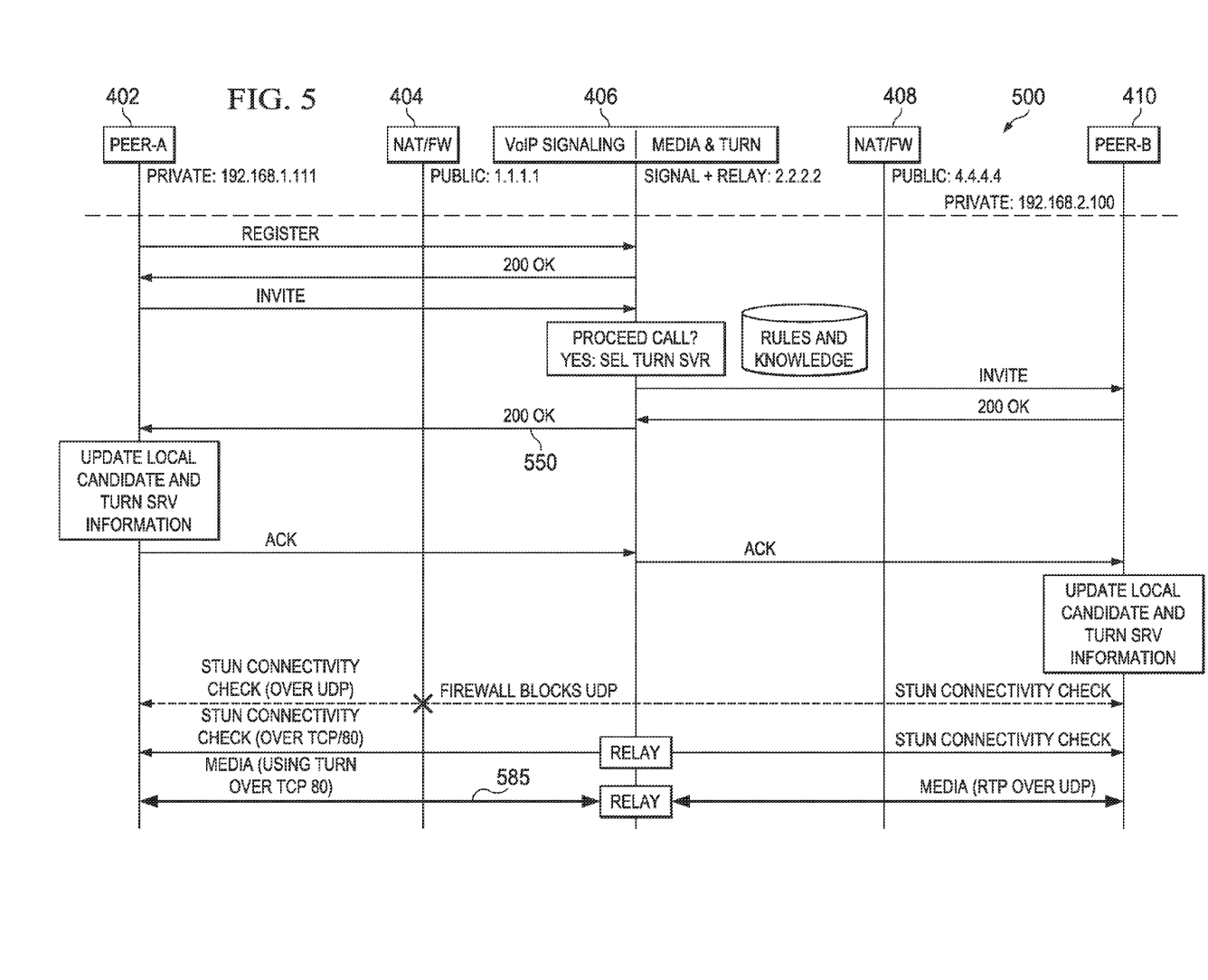
FIG. 5 illustrates a call flow diagram of a system for NAT/Firewall traversal according to another embodiment.

The example described above and illustrated in FIG. 4 can be modified slightly to perform firewall traversal. To illustrate, another embodiment of a system 500 for NAT/firewall traversal in accordance with this disclosure is described in accordance with the call flow diagram of FIG. 5. Assume the first NAT/Firewall 404 on the media path blocks UDP and only allows HTTP (TCP/80) and HTTPS (TCP/443) to pass through. If the TURN server supports firewall traversal, e.g., it supports TURN over TCP on port 80, the VoIP server 406 can change the TURN p-candidate returned in the "200 OK" message 550 to "tun-srv 2.2.2.2 tcp 80". This tells the first UE 402 that it can send media over TURN using TCP on port 80 (step 585). Because the TURN/media traffic looks like HTTP, the NAT/Firewall 404 will let it go through, and achieves firewall traversal.

Figure 6:
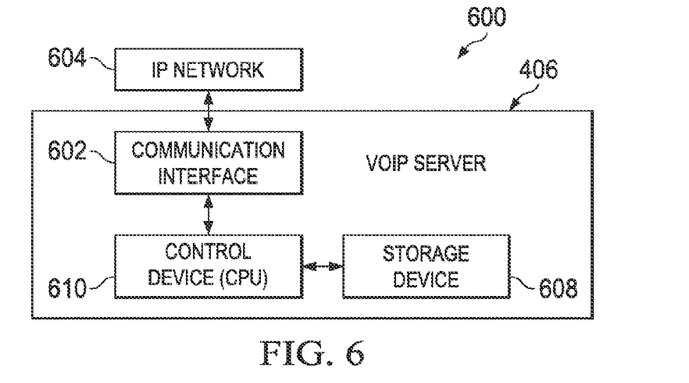
FIG. 6 illustrates a block diagram of a VoIP signaling server according to one embodiment.

FIG. 6 illustrates a block diagram of the VoIP signaling server 406. In a particular embodiment, The VoIP signaling server 406 is composed of a server computer such as an SIP server, H.323 server, or the like. As shown in FIG. 6, in its hardware configuration, the VoIP signaling server 406 includes, for example, a communication interface 602 coupled to an IP network 604, an Operating System (not shown), a storage device 608 for storing programs to serve as a VoIP server, and a control device 610 (e.g., a processor or CPU) which executes a program in the storage device 608 to control the entire operations.

The storage device 608 may include, for example, an OS, a communication protocol stack which controls data communication based on IP packets, a database, control programs, for example, call control protocols such as H.323, SIP, or the like which defines voice communication procedures (e.g., making and receiving calls), and a server program which defines processing procedures for the NAT and firewall traversal method.

The control device 610 may be a general purpose, special purpose or digital signal processor, and may be a plurality of processors or combination of such processors. The control device 610 includes functionality to perform signal coding, data processing, input/output processing, and/or any other functionality enabling the VoIP signaling server 406 to operate in the system 400 or the system 500. In addition, the control device 610 is coupled to the storage device 608 operable for storing and retrieving data. Any suitable type of memory storage device may be included, such as random-access memory (RAM), read-only memory (ROM), hard disk, subscriber identity module (SIM) card, a memory stick, a secure digital (SD) memory card, and the like.

Figure 7:
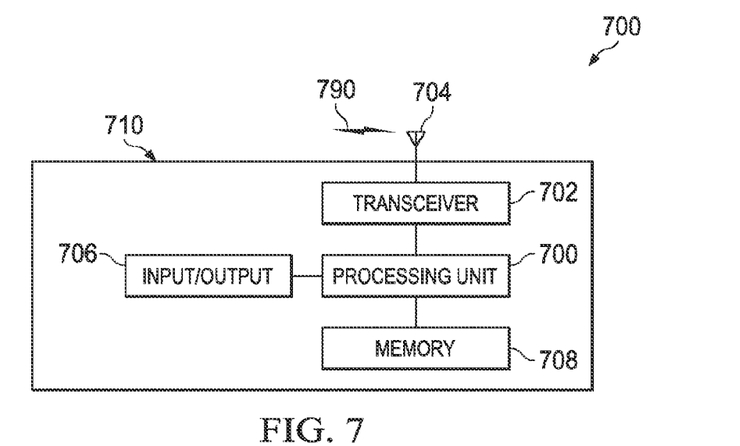
FIG. 7 illustrates a block diagram of a User Equipment (UE) according to one embodiment.

FIG. 7 illustrates a block diagram of an example User Equipment (UE) or an electronic device 710. The electronic device 710 may be, for example, a portable wireless electronic device. For example, the electronic device 710 may be a cellular telephone, a media player with wireless communications capabilities, a handheld computer (also sometimes called a personal digital assistant), a remote controller, a global positioning system (GPS) device, a tablet computer, and a handheld gaming device. The electronic device 710 includes a processor 700, a transceiver 702, an antenna element 704, one or more input/output devices 706 (e.g., speaker/microphone, keypad, display/touchpad) and memory 708. The electronic device 710 may be wirelessly coupled to a base station (not shown) via a wireless link 790.

The electronic device 710 may include one or more other components, devices, or functionalities (not shown). It will be understood that the electronic device 710 may include fewer or more of the foregoing described elements.

The processor 700 may be a general purpose, special purpose or digital signal processor, and may be a plurality of processors or combination of such processors. The processor 700 includes functionality to perform signal coding, data processing, power control, input/output processing, and/or any other functionality enabling the electronic device 710 to operate in the system 400 or the system 500. The processor 700 is coupled to the transceiver 702 which is coupled to the antenna element 704. It will be understood that the processor 700 and the transceiver 702 may be separate components or integrated together. Similarly, the antenna element 704 may be a single element or a number of elements (multiple antennas or elements).

The transceiver 702 is configured to modulate the data or signals for transmission by the antenna 704 and demodulate the data or signals received by the antenna 704.

The processor 700 is coupled to the one or more input/output devices 706 (including ports or busses) operable for inputting/outputting user data. In addition, the processor 700 is coupled to memory 708 operable for storing and retrieving data. Any suitable type of memory storage device may be included, such as random-access memory (RAM), read-only memory (ROM), hard disk, subscriber identity module (SIM) card, a memory stick, a secure digital (SD) memory card, and the like.

Other elements or devices that might be included within the electronic device 710 will not be described herein, unless necessary or relevant to an understanding of the present disclosure.

Figure 8:
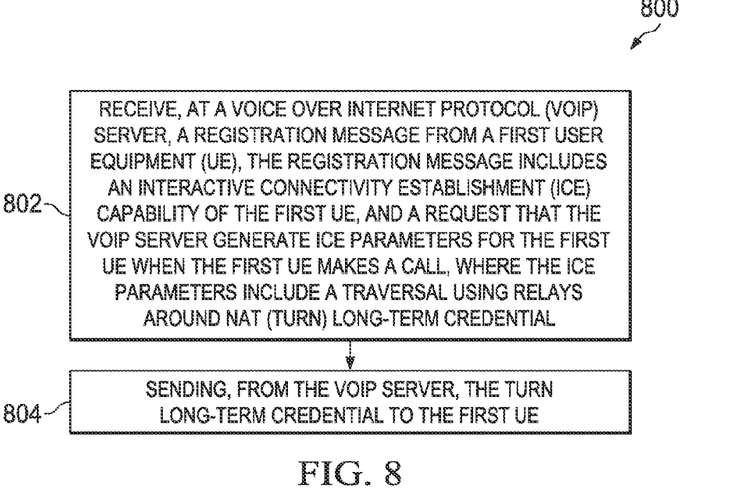
FIG. 8 illustrates a flow diagram illustrating a method of NAT traversal according to one embodiment.

FIG. 8 illustrates a flow diagram illustrating a method 800 of NAT traversal according to one embodiment. A registration message from a first user equipment (UE) is received at a Voice over Internet Protocol (VoIP) server. The registration message includes an Interactive Connectivity Establishment (ICE) capability of the first UE, and a request that the VoIP server generate ICE parameters for the first UE when the first UE makes a call. The ICE parameters include a Traversal Using Relays around NAT (TURN) long-term credential. For example, when the first UE 402 registers with the VoIP signaling server 406 via the REGISTER message, the first UE 402 indicates its ICE capabilities to the VoIP signaling server 406 and requests the VoIP signaling server 406 to provide ICE parameters, including a TURN long-term credential, TURN server selection and public address candidate and relay address candidate generation for the first UE 402 when making a call (step 415).

The TURN long-term credential is sent from the VoIP server to the first UE, at step 804. For example, the VoIP signaling server 406 returns requested parameters (e.g., TURN long-term credential) in its response message "200 OK" (step 420).

The present disclosure enhances the ICE/TURN/STUN protocol for increased security and improved service quality and service reachability through automatic credential provision and optimal TURN server selection and candidate generation by a VoIP server on the signaling path. The benefits of the enhanced protocol include, but are not limited to:

Enables a VoIP server to provide the TURN long-term credential for the UE through the signaling registration process. This allows the TURN server to authenticate TURN messages from the UE, e.g., address allocation requests.

When the VoIP server allocates the TURN address for the UE using the signaling channel, the UE does not request the TURN server to allocate an address and there is no need to use a long term credential to authenticate the allocate request for TURN. The signaling channel can be protected with a signaling security mechanism (e.g., SIP over TLS). This prevents an attacker from using compromised hosts or botnets to allocate many relay addresses from the TURN servers to exhaust addresses on the TURN server for denial-of-service attacks.

Enables a VoIP server or intermediary node on the signaling path to select the TURN server based on local or remote intelligence, e.g., the TURN server with the shortest media path, firewall traversal capabilities, least workload, etc. This can improve voice quality and service availability.

Reduces the number of messages for call flow and avoid allocating relay addresses on the TURN server for a failed call. This reduces call setup delay and saves bandwidth, CPU, memory and other resources on TURN servers.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of network address translation (NAT) traversal, the method comprising:
   receiving, at a Voice over Internet Protocol (VoIP) server, a registration message from a first user equipment (UE), the registration message including:
      an Interactive Connectivity Establishment (ICE) capability of the first UE, and
      a request that the VoIP server generate ICE parameters for the first UE when the first UE makes a call to a second UE, the ICE parameters including a Traversal Using Relays around NAT (TURN) long-term credential;
   sending, from the VoIP server, the TURN long-term credential to the first UE; and
   sending, from the VoIP server, an ICE parameter capability of the VoIP server to the first UE, wherein the ICE parameter capability of the VoIP server includes:
      a public address candidate indication that indicates whether the VoIP server supports generation of a public address candidate for the first UE when the first UE makes a call, and
      a TURN server selection and relay address candidate indication that indicates whether the VoIP server supports generation of a TURN server selection and relay address candidate for the first UE when the first UE makes a call.

2. The method in accordance with claim 1, further comprising:
   receiving, at the VoIP server, a first invite message from the first UE, the first invite message to initiate a call to the second UE, the first invite message including a host candidate for the first UE, the first invite message excluding the public address candidate for the first UE and the TURN server selection and relay address candidate for the first UE.

3. The method in accordance with claim 2, further comprising, at the VoIP server:
   in response to receiving the first invite message from the first UE, determining whether the call to the second UE can proceed;
   in response to determining that the call to the second UE can proceed, generating a first public address candidate for the first UE and a first TURN server selection and relay address candidate for the first UE, wherein the first TURN server selection and relay address candidate comprises a relay address; and
   in response to determining that the call to the second UE cannot proceed, terminating the call.

4. The method in accordance with claim 3, wherein generating the first TURN server selection and relay address candidate for the first UE includes:
   dynamically selecting a TURN server based on applying rules that are associated with one or more network parameters; and
   requesting the selected TURN server to allocate the TURN server relay address for the first UE.

5. The method in accordance with claim 4, further comprising, at the VoIP server:
   inserting the first public address candidate for the first UE and the first TURN server relay address candidate for the first UE into a second invite message; and
   sending the second invite message to the second UE.

6. The method in accordance with claim 5, further comprising, at the VoIP server, receiving a first response message from the second UE, the first response message including a host candidate for the second UE.

7. The method in accordance with claim 6, further comprising, at the VoIP server, determining whether to generate a second ICE parameters for the second UE in response to the second UE being in a call with the first UE, the second ICE parameters including a second public address candidate for the second UE and a second TURN server selection and relay address candidate for the second UE.

8. The method in accordance with claim 7, further comprising, at the VoIP server, generating the second public address candidate for the second UE and the second TURN server selection and relay address candidate for the second UE.

9. The method in accordance with claim 8, further comprising, at the VoIP server:
   inserting the second public address candidate for the second UE, and the second TURN server relay address candidate for the second UE into a second response message; and
   sending the second response message to the first UE.

10. The method in accordance with claim 9, further comprising obtaining, by the VoIP server, a first provision public address candidate for the first UE and a first provision TURN server relay address candidate for the first UE, wherein the first provision TURN server relay address candidate comprises a relay address and a selected TURN server.

11. The method in accordance with claim 10, further comprising, inserting the first provision public address candidate for the first UE and the first provision TURN server relay address candidate for the first UE into the second response message.

12. The method in accordance with claim 11, further comprising receiving, at the VoIP server, a first acknowledgement message from the first UE indicating successful call setup.

13. The method in accordance with claim 11, further comprising obtaining, by the VoIP server, a second provision public address candidate for the second UE and a second provision TURN server relay address candidate for the first UE.

14. The method in accordance with claim 13, further comprising sending, from the VoIP server, a second acknowledgement message to the second UE, the second acknowledgement message including the second provision public address candidate for the second UE and the second provision VoIP server allocated TURN server relay address candidate for the second UE.

15. The method in accordance with claim 14, further comprising, in response to the successful call setup, receiving, at the VoIP server, ICE messages from the first UE and the second UE, the ICE messages associated with a connectivity check between the first UE and the second UE.

16. The method in accordance with claim 4, further comprising:
   at the VoIP server:
      determining whether firewall traversal is supported by the selected TURN server;
      in response to firewall traversal being supported by the selected TURN server, informing the first UE that the TURN server selected by the VoIP server for the first UE supports firewall traversal.

17. The method in accordance with claim 16, wherein informing the first UE that the TURN server selected by the VoIP server for the first UE supports firewall traversal includes sending another response message to the first UE that includes a transmission control protocol (TCP) candidate.

18. A Voice over Internet Protocol (VoIP) server comprising:
- a processor coupled to a memory; and
- the memory storing a plurality of instructions;
- wherein when the instructions are executed by the processor, the instructions cause the processor to:
- receive a registration message from a first user equipment (UE), the registration message including:
  - an Interactive Connectivity Establishment (ICE) capability of the first UE, and
  - a request that the VoIP server generate ICE parameters for the first UE when the first UE makes a call to a second UE, the ICE parameters including a Traversal Using Relays around NAT (TURN) long-term credential;
- send the TURN long-term credential to the first UE; and
- send an ICE parameter capability of the VoIP server to the first UE, wherein the ICE parameter capability of the VoIP server includes:
  - a public address candidate indication that indicates whether the VoIP server supports generation of a public address candidate for the first UE when the first UE makes a call, and
  - a TURN server selection and relay address candidate indication that indicates whether the VoIP server supports generation of a TURN server selection and relay address candidate for the first UE when the first UE makes a call.

19. The VoIP server in accordance with claim 18, wherein the instructions further cause the processor to generate a first public address candidate for the first UE when the first UE makes a call and a first TURN server selection and relay address candidate for the first UE when the first UE makes a call, wherein the first TURN server selection and relay address candidate comprises a relay address.

20. The VoIP server in accordance with claim 19, wherein the instructions further cause the processor to:
- dynamically select a TURN server based on applying rules that are associated with one or more network parameters; and
- request the selected TURN server to allocate the TURN server relay address for the first UE.

21. The VoIP server in accordance with claim 20, wherein the instructions further cause the processor to:
- insert the first public address candidate for the first UE and the first TURN server relay address candidate for the first UE into an invite message; and
- send the invite message to the second UE.

22. The VoIP server in accordance with claim 21, wherein the instructions further cause the processor to:
- obtain a first provision public address candidate for the first UE and a first provision TURN server relay address candidate for the first UE, wherein the first provision TURN server relay address candidate comprises a relay address and a selected TURN server;
- insert the first provision public address candidate for the first UE and the first provision TURN server relay address candidate for the first UE into a response message; and
- send the response message to the first UE.

23. The VoIP server in accordance with claim 22, wherein the instructions further cause the processor to:
- generate a second public address candidate for the second UE and a second TURN server selection and relay address candidate for the second UE; and
- insert the second public address candidate for the second UE and the second TURN server relay address candidate for the second UE into the response message.

24. The VoIP server in accordance with claim 20, wherein the instructions further cause the processor to:
- determine whether firewall traversal is supported by the selected TURN server; and
- in response to firewall traversal being supported by the selected TURN server, send another response message to the first UE that includes a transmission control protocol (TCP) candidate.

* * * * *